United States Patent
Wang et al.

(10) Patent No.: US 7,395,863 B2
(45) Date of Patent: Jul. 8, 2008

(54) METHOD OF TREATING A SUBTERRANEAN FORMATION WITH AN OIL-BASED COMPOSITION CONTAINING A POLYSACCHARIDE-BASED WATER-SUPERABSORBENT MATERIAL

(75) Inventors: Xiaolan Wang, Baton Rouge, LA (US); Qi Qu, Spring, TX (US)

(73) Assignee: BJ Services Company, Houston, TX (US)

( * ) Notice: Subject to any disclaimer, the term of this patent is extended or adjusted under 35 U.S.C. 154(b) by 0 days.

(21) Appl. No.: 11/953,645

(22) Filed: Dec. 10, 2007

(65) Prior Publication Data

US 2008/0085843 A1 Apr. 10, 2008

Related U.S. Application Data

(62) Division of application No. 11/083,154, filed on Mar. 17, 2005, now Pat. No. 7,316,275.

(51) Int. Cl.
*E21B 43/26* (2006.01)
*E21B 43/27* (2006.01)
*C09K 8/64* (2006.01)
*C09K 8/72* (2006.01)

(52) U.S. Cl. ............ 166/307; 166/300; 166/305.1; 166/308.4; 166/308.5; 507/211; 507/238; 507/902; 507/903; 507/922; 507/933

(58) Field of Classification Search .......... 166/300, 166/305.1, 307, 308.4, 308.5; 507/203, 204, 507/211, 238, 269, 271, 902, 903, 922, 933
See application file for complete search history.

(56) References Cited

U.S. PATENT DOCUMENTS

| 3,633,689 | A | | 1/1972 | Christman |
| 3,827,978 | A | | 8/1974 | Miles |
| 3,831,678 | A | | 8/1974 | Mondshine |
| 4,258,791 | A | | 3/1981 | Brandt et al. |
| 4,371,443 | A | | 2/1983 | Keeney |
| 4,466,890 | A | | 8/1984 | Briscoe |
| 4,487,867 | A | | 12/1984 | Almond et al. |
| 4,664,816 | A | | 5/1987 | Walker |
| 4,730,674 | A | | 3/1988 | Burdge et al. |
| 4,799,962 | A | | 1/1989 | Ahmed |
| 4,836,940 | A | * | 6/1989 | Alexander ............ 507/119 |
| 5,077,336 | A | | 12/1991 | Nakashita et al. |
| 5,190,675 | A | * | 3/1993 | Gross ................... 507/238 |
| 5,502,082 | A | * | 3/1996 | Unger et al. .......... 521/141 |
| 5,674,816 | A | | 10/1997 | Loree |
| 5,919,739 | A | * | 7/1999 | Sunde et al. .......... 507/213 |
| 5,948,735 | A | | 9/1999 | Newlove et al. |
| 5,990,053 | A | * | 11/1999 | Jones et al. .......... 507/238 |
| 6,169,058 | B1 | * | 1/2001 | Le et al. .............. 507/222 |
| 6,218,343 | B1 | | 4/2001 | Burts, Jr. |
| 6,489,270 | B1 | | 12/2002 | Vollmer et al. |
| 6,581,701 | B2 | * | 6/2003 | Heying ................. 175/72 |
| 6,632,779 | B1 | | 10/2003 | Vollmer et al. |
| 6,667,279 | B1 | * | 12/2003 | Hessert et al. ........ 507/225 |
| 6,746,992 | B2 | | 6/2004 | Kippie et al. |
| 6,908,886 | B2 | | 6/2005 | Jones et al. |
| 6,983,799 | B2 | * | 1/2006 | Reddy et al. ......... 166/291 |
| 7,287,586 | B2 | * | 10/2007 | Everett et al. ........ 166/270 |
| 7,306,039 | B2 | * | 12/2007 | Wang et al. .......... 166/300 |
| 7,316,275 | B2 | * | 1/2008 | Wang et al. .......... 166/300 |
| 2004/0059054 | A1 | | 3/2004 | Lopez et al. |
| 2004/0063587 | A1 | | 4/2004 | Horton et al. |
| 2005/0038199 | A1 | | 2/2005 | Wang et al. |
| 2005/0113264 | A1 | | 5/2005 | Vollmer |
| 2005/0176591 | A1 | | 8/2005 | Jones et al. |
| 2006/0122071 | A1 | * | 6/2006 | Reddy et al. ......... 507/219 |
| 2006/0131536 | A1 | | 6/2006 | Qu et al. |

FOREIGN PATENT DOCUMENTS

JP 2003154262 5/2003

* cited by examiner

*Primary Examiner*—George Suchfield
(74) *Attorney, Agent, or Firm*—John Wilson Jones; Jones & Smith, LLP

(57) ABSTRACT

A well treating composition containing a polysaccharide-based water-superabsorbent material has particularly applicability as a thermal insulating, fracturing or acid stimulation fluid. The water-superabsorbent material is capable of absorbing, at a minimum, its own weight. Particularly effective are biodegradable materials containing guar gum and carrageenan. The composition may further contain a crosslinking agent, brine and/or a viscosifying polymer or a gelling agent. As an oil-based fluid, the crosslinking agent is absorbed onto the water-superabsorbent material and serves to effectively delay crosslinking.

21 Claims, No Drawings

METHOD OF TREATING A SUBTERRANEAN FORMATION WITH AN OIL-BASED COMPOSITION CONTAINING A POLYSACCHARIDE-BASED WATER-SUPERABSORBENT MATERIAL

This application is a divisional of U.S. patent application Ser. No. 11/083,154, filed on Mar. 17, 2005, now U.S. Pat. No. 7,316,275.

FIELD OF THE INVENTION

This invention relates to well treating compositions containing water-superabsorbent materials and their use in enhancing the productivity of a subterranean formation. The compositions are particularly effective in the thermal insulation of production tubing or transfer pipes, acid stimulation and hydraulic fracturing.

BACKGROUND OF THE INVENTION

Improved cost effective and productive methods are constantly being sought to increase the production of hydrocarbons from hydrocarbon-bearing formations. Recently, water-superabsorbent polymers have been reported for use in gelled fluids as thermal insulating fluids. Such fluids, when added either into an annulus or riser, effectively reduce undesired heat loss from the production tubing, or heat transfer to outer annuli. In some cases, heat loss from the produced fluids due to conduction and convection can be reduced by more than 90% when compared with conventional packer fluids. Such fluids exhibit low thermal conductivity and are capable of securing the insulation of the wellbore while reducing the amount of heat transfer from the production tubing to the surrounding wellbore, internal annuli, and riser. Alternative materials, especially those that are environmental friendly, such as biodegradable additives, have been sought as well as insulating compositions which are oil based.

In addition to their use in thermal insulating compositions, gelled fluids, such as oil or hydrocarbon based gels, have been used for other oilfield applications, such as hydraulic fracturing, acid stimulation, drilling, drill-in, and fluid loss control fluids. In particular, such liquids have been used in drilling applications as synthetic oil based drilling muds.

Gelled organic liquids, such as hydrocarbons, are typically prepared by introducing into the organic liquid (or hydrocarbon) a phosphate ester based gelling agent and an aluminum-containing or ferric-containing crosslinking agent or activator. The reaction between the phosphate ester and aluminum or ferric crosslinking agent forms an aluminum phosphate ester or ferric ester which, in turn, gels the organic liquid. Alternatively, organic liquids may be gelled by introducing a phosphate ester into the organic liquid (or hydrocarbon) and then reacting the liquid mixture in-situ with a metal activator.

In hydraulic fracturing, the viscosity of the fluid must be sufficiently high as to suspend and carry the proppant as it enters the formation but sufficiently low to be readily pumpable. The viscosity of the gel must further be sufficient to prevent the proppant from prematurely settling from the gel. If the gel is overly viscous, pumping becomes difficult. In such instances, delayed gelling is desired.

Delay gelling can reduce the friction of the fluid while it is being pumped downhole through the production tubing. This further may reduce the required pumping horsepower. Delayed gelling may also reduce the negative impact of shear on fluid properties. Depending on the pumping rate and tubing size, the desired delay time of gelling can vary from minutes to hours.

In other applications, such as when the composition is being used as an insulating fluid, delay gelling is required due to the limited access to the annulus during the placement of the fluid into the annulus. The desired delay time of gelling in such situations is usually much longer, typically ranging from hours to days.

Oil based gels are usually required when the hydrocarbon-bearing formation is sensitive to water based fluids. Several methods have been used to delay gelling oil-based gels. Such methods involve the addition of chelating agents to an aqueous aluminum-containing activator to control the availability of active aluminum ions. This approach, however, typically delays gelling for only a few minutes. Alternatives have been consistently sought for oil-based gels which exhibit delay gelling for longer periods of time.

SUMMARY OF THE INVENTION

The invention relates to a well treating composition containing a water-superabsorbent material capable of absorbing, at a minimum, its own weight. Particularly effective are superabsorbent materials comprising guar gum and carrageenan. Such superabsorbent materials are biodegradable and are environmentally friendly.

The composition of the invention may further contain a crosslinking agent as well as water and/or brine and/or a viscosifying polymer. In certain applications, the composition may include, in addition to a crosslinking agent, a gelling agent.

The invention further relates to processes for enhancing the productivity of subterranean formations by introducing into the formation such well treating compositions. The compositions of the invention have particular applicability when used as water or oil-based thermal insulating compositions, as well as oil-based fracturing and acid stimulation fluids. In oil-based fluids, the crosslinking agent is absorbed onto the superabsorbent material and the composition further contains a gelling agent. Absorption of the crosslinking agent onto the superabsorbent material effectively delays the crosslinking reaction between the gelling and crosslinking agents.

DETAILED DESCRIPTION OF THE PREFERRED EMBODIMENTS

The well treating composition of the invention has particular applicability as a water or oil-based thermal insulating composition as well as an oil-based fracturing or acid stimulation fluid.

The viscosity of the composition is such that the composition is pumpable. For instance, when used as a thermal insulating composition, the viscosity is sufficient to reduce the convection flow velocity within the annulus and immobilize the water and/or brine or oil. When used as an acid stimulation or fracturing fluid, as well as a thermal insulating fluid, the fluid must be easy to blend and pump at the rig site. When used as a fracturing fluid, the viscosity of the composition is sufficient to suspend and carry the proppant into the formation.

The well treating composition of the invention contains a water-superabsorbent material. As used herein, the term "water-superabsorbent material" means a polysaccharide containing material capable in its dry state of absorbing and retaining a minimum of its own weight in water. In a preferred embodiment, the water-superabsorbent material is capable of absorbing a minimum of 20, preferably 100 times its own weight in water.

In some instances, the superabsorbent material may have a water-absorbing capacity up to 2,000 times its own weight and, in other instances, about 1,500 times its own weight. Such water-absorbing properties are defined under normal conditions of temperature (25° C.) and pressure (760 mm Hg, i.e., 100,000 Pa) and generally for distilled water. In water-based systems, the water-superabsorbent material is principally involved in contributing to the increased viscosity of the composition and to control, through gelling, solvent movement. In oil-based systems, the water-superabsorbent material serves principally as the vehicle to absorb first and then to release the active component, i.e., crosslinking agent wherein the active component is slowly released from the superabsorbent material.

Guar Gum/Carrageenan Superabsorbent Material

In a preferred embodiment, the water-superabsorbent material is made from guar gum and carrageenan. Such materials, in addition to having excellent water absorptive properties, are further biodegradable. When used as an insulating fluid, the water-superabsorbent materials are capable of further increasing the viscosity of the insulating fluid at low shear rate and/or reduce its water and/or polyol mobility. Suitable materials include those disclosed in Japanese Kokai Patent Application No. P2003-154262A, herein incorporated by reference.

The guar gum used in the water-superabsorbent material includes natural guar gum as well as enzyme treated guar gum; the latter having been obtained by treating natural guar gum with galactosidase, mannosidase, or another enzyme. The guar gum may further be a galactomannan derivative prepared by treating natural guar gum with chemicals to introduce carboxyl groups, hydroxyl alkyl groups, sulfate groups, phosphate groups, etc. Also, as needed, one may add a natural polysaccharide, other than guar gum and carrageenan, to form a mixture for use. Such natural polysaccharides include xanthan gum, agar, pectin, alginic acid, tragacanth gum, pluran, gellan gum, tamarind seed gum, cardlan, gum arabic, glucomannan, starch, cellulose, chitin, chitosan, hyaluronic acid, etc.

Carrageenan (carrageenans and carrageenan gums), a high molecular weight naturally occurring polysaccharide derived from seaweed, are ionic linear polysaccharides comprising repeating galactose units which individually may be sulfated or unsulfated. Specific carrageenan types include kappa, iota and lambda. Properties of the three types of carrageenan primarily depend on the number and position of sulfate groups on the repeating galactose units. Kappa carrageenan is composed of 1,3 bonded galactose 4 sulfite and 1,4 bonded 3,6-anhydro-D-galactose. Iota carrageenan is composed of 1,3 bonded galactose-4-sulfite and 1,4 bonded 3,6-anhydro-D-galactose-2-sulfite. Lambda carrageenan is composed of 1,3 bonded galactose-2-sulfite and 1,4 bonded D galactose-2,6-sulfite. Kappa carrageenan is capable of forming a strong gel. Iota carrageenan has weak gelling ability and lambda carrageenan has no gelling ability. Mixtures of carrageenan types are also possible though it is preferred to use those carrageenans or carrageenan-like materials capable of forming a gel. Typically a carrageenan has a molecular weight of between about 10,000 and about 500,000.

In addition to natural carrageenan, suitable carrageenans for use in the invention include enzyme-treated substances of natural carrageenan, carrageenan derivatives prepared by treating natural carrageenan with chemicals to introduce new functional groups, such as carboxyl groups, hydroxyl alkyl groups, sulfate groups, phosphate groups, etc.

The water-superabsorbent material is prepared by swelling the carrageenan and guar gum with water and subjecting the resulting composition to hydration such that the total solid content of guar gum and carrageenan in the composition is 2 weight percent or more, preferably in the range of about 3 to about 6 weight percent. As an alternative method, the carrageenan and guar gum powder may be hydrated separately and swelled separately followed by mixing with each other. The proportion by weight of carrageenan with respect to the total quantity of carrageenan and guar gum should be in the range of 0.5-80 weight percent, or preferably in the range of 2-50 weight percent.

The swelled composition is then heated and gelled at 55° C. or higher, preferably 70° C. or higher. The heating time may be adjusted depending on the concentration of the carrageenan and guar gum in the composition and the heating temperature. Usually, in order to form a homogeneous gel mixture, the heating time is preferably 30 minutes or longer.

The heat-treated gel is then contacted with a hydrophilic volatile organic solvent so that the water content in the gel is partially or entirely dehydrated from the solvent and the water content in the solid substance is substituted with the solvent. Suitable hydrophilic volatile organic solvents include methyl alcohol, ethyl alcohol, n-propyl alcohol, isopropyl alcohol, n-butyl alcohol, iso-butyl alcohol, t-butyl alcohol, and other lower alcohols, acetone, methyl ethyl ketone, and other ketones, dioxane, tetrahydrofuran, and other ethers, N,N-dimethyl formamide, and other amides, dimethyl sulfoxide, and other sulfoxides, etc. Methanol, ethanol, isopropyl alcohol, and other lower alcohols are preferred.

The amount of hydrophilic volatile organic solvent with respect to 100 weight percent of the substituted water in the gel is from about 50 to about 500 weight percent.

The composition is then dried by any conventional method which does not lead to a decrease in the water absorptivity and water absorption rate or a decrease in the gel strength after absorption of water. For example, room-temperature drying, heat drying, freeze drying, drying under reduced pressure or vacuum drying are acceptable. Heat drying at from about 30° C. to about 100° C. is preferred.

There is no limitation on the form of the solid substance which may be obtained. For instance, the dried composition may be granules, flakes, sheets, powder, fragments, thin pieces, rods, lines, etc. For example, when the granular or powder form solid substance is to be formed, the gel is crushed, preferably at high shear, while it is brought in contact with the hydrophilic volatile organic solvent. Conventional blenders or kneaders or modifications of such devices may be used. Examples of such devices include cylindrical type mixers, double-wall conical type mixers, high-speed agitating type mixers, V-shaped mixers, ribbon-shaped mixers, screw type mixers, flowing-type furnace rotary disk type mixers, gas flow type mixers, double-arm type kneaders, internal mixers, crushing type kneaders, rotary type mixers, screw type extruders, etc. When the obtained solid substance is converted to a fiber shape, the gel may be continuously ejected in fiber form from a spinning machine having an appropriate nozzle diameter; the ejected fiber is then brought into contact with the hydrophilic volatile organic solvent. On the other hand, when a film-shaped solid substance is to be obtained, the gel is coated with an appropriate thickness onto an appropriate base, and is then brought into contact with the hydrophilic volatile organic solvent.

In order to recover the solids after substituting the water content in the gel with the organic solvent, filtering, decantation, centrifuge, or other conventional methods may be employed. In this way, the solid substance is separated and recovered from the hydrophilic volatile organic solvent containing water.

Trivalent or higher polyvalent metal ions are added to the hydrated and/or gelled composition to crosslink the composition. Examples of the trivalent or higher polyvalent metal ions include boron, titanium, zirconium, aluminum, yttrium, cerium, etc. or a mixture thereof. Boron, titanium and zirconium are preferred. Suitable crosslinkers are compounds having two or more functional groups that can react with the functional groups of carrageenan and guar gum. Hydrophilic and water-soluble metal salts are preferred.

Examples of titanium salts include titanium diisopropoxide bisacetyl aminate, titanium tetra-2-ethyl hexoxide, titanium tetra-isopropoxide, titanium di-n-butoxy bistriethanol aminate, titanium isopropoxyoctylene glycolate, titanium diisopropoxybistriethanol aminate and titanium chloride.

Examples of zirconium salts include zirconium ammonium carbonate, zirconium chloride, sodium zirconium lactate, zirconium oxyacetate, zirconium acetate, zirconium oxynitrate, zirconium sulfate, tetrabutoxyzirconium, zirconium monoacetyl acetonate, zirconium normal butyrate and zirconium normal propylate.

The resulting product is further subjected to surface crosslinking. Suitable surface crosslinking agents may be a hydrophilic, preferably water-soluble, compound containing two or more functional groups that can react with the functional groups of carrageenan and guar gum. Examples include glutals aldehyde, glyoxal, and other polyhydric aldehydes; ethylene glycol diglycidyl ether, polyethylene glycol diglycidyl ether, glycerol polyglycidyl ether, diglycerol polyglycidyl ether, polyglycerol polyglycidyl ether, sorbitol polyglycidyl ether, pentaerythritol polyglycidyl ether, propylene glycol diglycidyl ether, polypropylene glycol diglycidyl ether, and other polyhydric glycidyl compounds; dichloroethane, tetramethylene chlorobromide, dibromopropane, dibromobutane, and other polyvalent halogen compounds, epichlorohydrin, α-methyl chlorohydrin, and other haloepoxy compounds.

The amount of crosslinking agent may be dependent on which surface crosslinking agent is employed. Typically, when polyhydric aldehyde, haloepoxy compound, and other organic compound-based crosslinking agents are used, the amount of the crosslinker with respect to 100 mass % of the water absorptive material in the dry state should be in the range of 0.01-5 mass %, or preferably in the range of 0.05-3 mass %. With other crosslinking agents, the quantity could be in the range of 1-500 mmol, preferably 5-100 mmol, with respect to 1 kg of the mixture of carrageenan and guar gum.

In order to promote the crosslinking reaction, the temperature is preferably in the range of 5-90° C., or more preferably in the range of 20-50° C. As the crosslinking agent is added, the pH varies. The final pH of the gel should be in the range of 5-13, or preferably in the range of 7-10. Consequently, when the pH is outside this range, one may add sodium hydroxide or hydrochloric acid appropriately to adjust the pH value.

Crosslinking may occur by mixing the heated gel with the crosslinking agent using a solvent. In another method, the heated gel may be dispersed in cyclohexane, pentane or other hydrophobic solvent and mixed with the crosslinking agent. In yet another method, after the crosslinking agent is dissolved or dispersed in a hydrophilic solvent, the solution or dispersion is sprayed or applied dropwise on the heated gel for mixing. The hydrophilic solvent may be water or a mixture of water and the above stated hydrophilic volatile organic solvent.

Other Water-Superabsorbent Materials

The water-superabsorbent material may further be starch-based such as a starch graft acrylonitrile or methacrylonitrile, such as those using ceric salts as catalysts to form starch-acrylonitrile graft copolymers. See, for example, U.S. Pat. No. 2,922,768. Such graft copolymers can also be prepared by the reaction of acrylonitrile with preirradiated starch which is prepared by irradiation of starch with gamma rays or an electron beam. See Reyes, Clark, Comas, Russell, and Rise, Nuclear Applications 6, 509-517 (1969).

After the starch polyacrylonitrile graft copolymer is produced to make it valuable as a water-insoluble material having the ability to absorb large amounts of water, it may be saponified. For example, U.S. Pat. No. 3,425,971 is directed to saponification of a graft copolymer in an aqueous potassium hydroxide solution.

Other suitable water-superabsorbent materials are the alkali metal salts of saponified granular starch-polyacrylonitrile or starch-polymethacrylonitrile (S-PAN) graft copolymers, such as those disclosed in U.S. Pat. No. 3,661,815, herein incorporated by reference. These products are prepared by saponifying starch-polyacrylonitrile graft copolymers in an aqueous alcoholic solution of an alkali metal base. These materials are substantially water-insoluble granular products having the capacity to absorb aqueous liquids and include alkali metal carboxylate salts of a starch-polyacrylonitrile graft copolymer or a starch-polymethacrylonitrile graft copolymer.

Further included as suitable water-superabsorbent materials are:
  starch-grafted polyacrylates;
  guar gum, optionally crosslinked;
  starch-grafted acrylamide/acrylic acid, including sodium and potassium salts of such polymers, such as those sold under the names WATERLOCK A-100, WATERLOCK A-200, WATERLOCK D-200, and WATERLOCK B-204, from Grain Processing Corporation;
  starch-acrylonitrile graft copolymers;
  sodium and potassium salts of carboxymethylcellulose;
  chitosan/polyvinylpyrrolidone and chitosan/polyethyleneimine combinations; and
  carboxymethlycellulose.

The water-superabsorbent material may be present in the inventive compositions in an amount ranging from about 0.05 to about 30% by weight, relative to the total weight of the composition, preferably from about 0.2 to about 20% by weight.

Aqueous Thermal Insulation Composition

The water-superabsorbent material may be included in an aqueous based composition. Such compositions have particular applicability as thermal insulating compositions. When used as a thermal insulating composition, the fluid contains a brine and/or water and a viscosifying polymer and, optionally, a polyol, buffer, biocide and/or corrosion inhibitor. Further, the composition may contain a crosslinking agent. The desired fluid viscosity is obtained by mixing the water-superabsorbent material, preferably between 0.1 to 10% by weight, into a brine system having the desired density to render a fluid that is easy to blend and pump at the rig site. The biocides as well as buffers and corrosion inhibitors suitable for use in the invention are those known in the art and are employed in amounts recognized in the art.

After absorption of the aqueous fluid, the particles of the water-superabsorbent material thus impregnated with aqueous fluid may remain insoluble in the aqueous fluid and thus retain their individual particulate state. The water-superabsorbent material may be in the form of particles, fibers, beads, a liquid or a paste. As a bead or solid particulate, the water-superabsorbent material may be a water swellable particle having a mean size of less than 20 mm.

Viscosifying polymers, such as CMHPG, are not necessary for the composition to function as a thermal insulating composition. Thus, the composition may contain the water-superabsorbent material without supplementary polymers, brine, or polyol. Further, it is possible for the insulating fluid to contain no water. An exemplary insulating fluid with superior insulation properties for use in the invention may include 0.05 to 20% by weight of water-superabsorbent material; 0 to 99.95% by weight of water and/or brine containing inorganic or organic salts; 0 to about 5% by weight of polysaccharides and/or other viscosifying polymers; and 0 to 95% of polyol.

When used as a thermal insulating composition, the composition further contains from about 20 to about 99 weight percent water or brine. The brine may be saturated or unsaturated brine. By saturated brine, it is understood that the brine is saturated with at least one salt.

The water-superabsorbent material and, if desired, the viscosifying polymer and, when further desired, polyol, may be added to the water and/or brine. For instance, the water-superabsorbent material and the viscosifying polymer may be added to the polyol which is then mixed with the aqueous brine. In one embodiment of the present invention, the fluid is substantially free of water.

Suitable viscosifying polymers include those which may be crosslinkable and preferably include polysaccharides, anionic as well as nonionic, such as guar gums and derivatives, cellulose, starch, and galactomannan gums as well as polyvinyl alcohols, polyacrylates, polypyrrolidones and polyacrylamides and mixtures thereof. In addition, the viscosifying polymer of the invention may be a block or random copolymer containing units selected from vinyl alcohol, acrylates, including the (meth)acrylates, pyrrolidone, 2-acrylamido-2-methylpropane sulfonate and acrylamide including the (meth)acrylamides.

Cellulose and cellulose derivatives include alkylcellulose, hydroxyalkyl cellulose or alkylhydroxyalkyl cellulose, carboxyalkyl cellulose derivatives such as methyl cellulose, hydroxyethyl cellulose, hydroxypropyl cellulose, hydroxybutyl cellulose, hydroxyethylmethyl cellulose, hydroxypropylmethyl cellulose, hydroxylbutylmethyl cellulose, methylhydroxyethyl cellulose, methylhydroxypropyl cellulose, ethylhydroxyethyl cellulose, carboxyethylecellulose, carboxymethylcellulose and carboxymethylhydroxyethyl cellulose. The polysaccharides also include microbial polysaccharides such as xanthan, succinoglycan and scleroglucan as well as galactomannan gums and derivatized galactomannan gums.

Specific examples of polysaccharides useful with the present invention include, but are not limited to, guar gum, hydroxypropyl guar, carboxymethylhydroxypropyl guar and known derivatives of these gums.

The viscosifying polymer is typically present in the thermal insulating composition at a range between from about 0.1 to about 5, preferably from about 1 to about 3, weight percent. The viscosifier is included in the present invention to provide a fluid having a viscosity sufficient to reduce the convection flow velocity within the annulus.

The thermal insulating composition may further include a polyol as a solvent. Such solvents are of assistance in keeping the viscosifying polymer dispersed in the composition and to prevent it from decomposing while being subjected to the extreme conditions offered by deep wellbores. In addition, the polyol serves to reduce the thermal conductivity of the composition and thus imparts thermal insulation to the composition. In a preferred embodiment, the viscosifying polymer is introduced to the polyol and the resulting slurry is then added to the brine and the crosslinking agent, if present.

The polyol is preferably glycerol, a glycol or a polyglycols and mixtures thereof. The glycols include commonly known glycols such as ethylene glycol, propylene glycol and butylene glycol. The polyglycols can be selected from a wide range of known polymeric polyols that include polyethylene glycol, poly(1,3-propanediol), poly(1,2-propanediol), poly(1,2-butanediol), poly(1,3-butanediol), poly(1,4-butanediol), poly(2,3-butanediol), co-polymers, block polymers and mixtures of these polymers. A wide variety of polyglycols is commercially available. Most commercially available polyglycols include polyethylene glycol, and are usually designated by a number that roughly corresponds to the average molecular weight. Examples of useful commercially available polyethylene glycols include polyethylene glycol 4000 and polyethylene glycol 6000. Preferably the polymeric polyols for use in the present invention are selected to have a number average molecular weight, $M_n$, of about 150 to about 18,000 Daltons. More preferably, the polymeric polyols are selected to have number average molecular weight of about 190 to about 10,000 D. Yet most preferably, the polymeric polyols are selected to have number average molecular weight of about 500 to about 8,000 D. When present, the composition of the invention will typically contain between from about 10 to about 80 wt % of polyol.

Use of polyglycols having the described number average molecular weight in the present invention provide a fluid that exhibits stable rheological properties especially at elevated temperatures and over extended periods of time. These polyglycols are particularly well suited for deep wellbores that exert high temperature and pressures on fluids.

The compositions of the invention may further contain a crosslinking metal-releasing agent. As used herein, the term "crosslinking metal-releasing agent" is taken to designate those metal or metal containing materials which will provide a metal ion or metal containing species in the solution capable of crosslinking the viscosifying polymer.

The crosslinking agent preferably comprises a borate ion releasing compound, an organometallic or organic complexed metal ion comprising at least one transition metal or alkaline earth metal ion as well as mixtures thereof, such as Zr (IV) and Ti (IV). Typically, the crosslinking agent is employed in the composition in a concentration of from about 0.001 percent to about 2 percent, preferably from about 0.005 percent to about 1.5 percent, and, most preferably, from about 0.01 percent to about 1.0 percent.

Borate ion releasing compounds which can be employed include, for example, any boron compound which will supply borate ions in the composition, for example, boric acid, alkali metal borates such as sodium diborate, potassium tetraborate, sodium tetraborate (borax), pentaborates and the like and alkaline and zinc metal borates. Such borate ion releasing compounds are disclosed in U.S. Pat. No. 3,058,909 and U.S. Pat. No. 3,974,077 herein incorporated by reference. In addition, such borate ion releasing compounds include boric oxide (such as selected from $H_3BO_3$ and $B_2O_3$) and polymeric borate compounds. An example of a suitable polymeric borate compound is a polymeric compound of boric acid and an alkali borate which is commercially available under the trademark POLYBOR® from U.S. Borax of Valencia, Calif. Mixtures of any of the referenced borate ion releasing compounds may further be employed. Such borate-releasers typically require a basic pH (e.g., 7.0 to 12) for crosslinking to occur.

Further preferred crosslinking agents are reagents, such as organometallic and organic complexed metal compounds, which can supply zirconium IV ions such as, for example, zirconium lactate, zirconium lactate triethanolamine, zirconium carbonate, zirconium acetylacetonate and zirconium diisopropylamine lactate; as well as compounds that can supply titanium IV ions such as, for example, titanium ammonium lactate, titanium triethanolamine, and titanium acetylacetonate. Zr (IV) and Ti (IV) may further be added directly as ions or oxy ions into the composition.

Such organometallic and organic complexed metal crosslinking agents containing titanium or zirconium in a +4 valence state include those disclosed in British Pat. No. 2,108,122, herein incorporated herein by reference, which are prepared by reacting zirconium tetraalkoxides with alkanolamines under essentially anhydrous conditions. Other zirconium and titanium crosslinking agents are described, for example, in U.S. Pat. No. 3,888,312; U.S. Pat. No. 3,301,723; U.S. Pat. No. 4,460,751; U.S. Pat. No. 4,477,360; Europe Pat. No. 92,755; and U.S. Pat. No. 4,780,223, all of which are herein incorporated by reference. Such organometallic and organic complexed metal crosslinking agents containing titanium or zirconium in a +4 oxidation valance state may contain one or more alkanolamine ligands such as ethanolamine (mono-, di- or triethanolamine) ligands, such as bis(triethanolamine)bis(isopropol)-titanium (IV). Further, the compounds may be supplied as inorganic oxides, such as zirconium or titanium dioxide. Such crosslinking agents are typically used at a pH also in the range from about 6 to about 13.

Any suitable crosslinking metal ion, metal containing species, or mixture of such ions and species may further be employed. In a preferred embodiment, the crosslinking agent for use in the thermal insulating composition of the invention are reagents capable of providing Zn (II), calcium, magnesium, aluminum, Fe (II), and Fe (III) to the composition. These may be applied directly to the composition as ions or as polyvalent metallic compounds such as hydroxides and chlorides from which the ions may be released. When used as an oil-gelling composition, the crosslinking agent is preferably Fe (II), Fe (III) or a complex capable of releasing Fe (II) or Fe (III).

The crosslinking ions or species may be provided, as indicated, by dissolving into the solution compounds containing the appropriate metals or the metal ion per se. The concentration of crosslinking agent is dependent on factors such as the temperature in the annuli and will normally range from about 5 ppm to about 2000 ppm, preferably from about 100 ppm to about 900 ppm. It is an important advantage of the invention that higher levels of the crosslinking metal ion or metal containing species may be employed, thereby insuring improved crosslinking. When desired, crosslinking typically occurs after the thermal insulating composition is within the annuli.

Zirconium crosslinkers, such as those described in British Pat. No. 2,108,122, are a preferred class of crosslinkers for use herein. Such crosslinkers are preferred because of their "delayed" or "retarded" crosslinking reactivity. This delayed activity is useful because it lets the operator formulate and pump the uncrosslinked composition while it has a relatively lower viscosity which means easier pumping. The delayed systems are usually designed to crosslink while the fluid is being pumped through the wellbore tubing and/or as the fluid enters into the annuli.

The thermal insulating composition of the invention may be prepared on the surface and then pumped through tubing in the wellbore or in the annulus. In a preferred embodiment, the fluid is a packer or riser fluid and the packer fluid is introduced above the packer in an annulus and the riser fluid is introduced into a riser annulus.

While high viscosity, thickened fluid is highly desirable after the fluid is positioned in the annulus, large amounts of energy are required to pump such fluids through tubing and annular spaces. Crosslinking, when desired, may be delayed, thereby reducing the amount of energy required to pump viscous fluids through the tubing by permitting pumping of a relatively less viscous fluid having relatively low friction pressures within the well tubing. Crosslinking is typically affected when the fluid is placed in the annulus after which the advantageous properties of thickened crosslinked fluid are then available for thermal insulation.

The thermal insulating compositions of the invention serve a dual purpose. First, they serve to prevent heat transfer/buildup in the outer annuli. Second, they serve to retain heat within the produced hydrocarbons. The compositions further provide lower viscosity at high shear rate to facilitate the fluid placement.

The composition, when pumped into an annuli surrounding the production tubing or transfer piping, enhances the thermal insulating quality around the tubing or piping, thereby reducing heat loss from it. The composition further provides high viscosity at low shear rate so as to reduce the rate of fluid convection to near zero. Since convection is fluid motion caused by the variation of fluid density with temperature, increasing fluid viscosity decreases fluid motion, and correspondingly, decreases free annular convection. Thus, the desired rheological profile for the insulating fluid of the invention includes high viscosity at low shear rate in order to reduce the free fluid convection caused by temperature differential. Additionally, a low viscosity at high shear rate is desired to facilitate the placement of the insulating fluid at the desired location.

The thermal insulating compositions should be approached on a specific project basis to meet a target objective in terms of viscosity and density. Density is normally dictated by the required hydrostatic pressure needed to control the well, and may be achieved by the amount and type of salt dissolved within the composition (resulting from the brine, etc.).

Oil-Based Gelling Agent

In addition to their inclusion in water-based compositions, such as water-based thermal insulating compositions, the water-superabsorbent materials may further be used in oil-based compositions when the formation is sensitive to water based fluids. Such compositions may include thermal insulating gels, hydraulic fracturing fluids, as well as acid stimulation fluids.

The preferred gelling agents for the oil-based liquids are the alkyl or orthophosphate esters; aqueous aluminum or ferric solutions are preferably used as crosslinker or activator. These gelling agents are effective viscosifiers in a wide range of oil types, and are most effective when neutralized (i.e., no excess presence of base or acid). Specific alkyl phosphate ester gelling agents include $C_{3-18}$ (preferably $C_{6-10}$) alkyl diester acids, $C_{8-10}$ alkyl diester acid, mixtures of the above, and analogous mono and diesters. Such alkyl phosphate esters or diesters are typically prepared by reacting a $C_{3-18}$ aliphatic alcohol with phosphorous pentoxide. The phosphate intermediate interchanges its ester groups with triethyl phosphate with triethylphosphate producing a more broad distribution of alkyl phosphate esters. Alternatively, the gelling agent may be made by admixing with an alkyl diester, a mixture of low molecular weight alkyl alcohols or diols. The low molecular weight alkyl alcohols or diols preferably include $C_6$ to $C_{10}$ alcohols or diols. The alcohol mixture, however, will contain from 0.05 to 5.0 wt. %, preferably from 0.1 to 3.0 wt % of the high molecular weight alcohol or diol. The low molecular weight alcohols (or diols) and the high molecular weight alcohols (or diols) may be added as a mixture or added separate in the production of the phosphate ester.

When used as an oil gelling agent, the composition of the invention further contains a crosslinking agent. Preferred are aluminum or ferric crosslinkers. The crosslinker is absorbed onto the water-superabsorbent. The water-superabsorbent is then added to an organic liquid or hydrocarbon and gelling agent. The crosslinking agent is preferably one which has an affinity to the superabsorbent such that it absorbs onto the superabsorbent. In light of the opposite nature of the aqueous solution absorbed by the superabsorbent to hydrocarbon continuous phase, the crosslinking agent is slowly released and diffuses into the organic liquid. The released crosslinking agent then reacts in situ with the gelling agent to gel the organic liquid or hydrocarbon. The delay time may range from minutes to hours or days and can be controlled by adjusting the ratio between the activator concentration and the loading of the superabsorbent. In addition to providing longer delay times, such compositions could yield an oil slurry with viscosity similar to that of linear polymer gel for days before a fully crosslinked system develops.

The organic liquid is typically a hydrocarbon such as crude oil, diesel oil, kerosene, or other refined hydrocarbon.

The proppant is usually entrained in the gel by known blending techniques, and the slurry (gel and proppant) is then pumped down the well into the subterranean formation, at sufficient flow rates and pressure so as to create and/or extend a fracture into the formation.

It is preferred also to add a small amount of sodium hydroxide and water to increase the pH to optimum gelling range at the time the aluminum compound is added. The final pH should be partially acidic. The phosphate ester and crosslinking agent at the proper pH react in the oil to gel the oil.

In most applications the concentration of the gelling agent will be from 0.05 to 4.0 wt %, preferably 0.5 to 2.0 wt %, of the oil-base liquid.

The composition of the invention may be produced in shore-based facilities, transported to, and pumped. This provides a convenient means to blend, temporarily store, and then pump large quantities of fluid into the wellbore and riser annuli (as thermal insulating compositions) without using rig tanks.

The following examples will illustrate the practice of the present invention in a preferred embodiment. Other embodiments within the scope of the claims herein will be apparent to one skilled in the art from consideration of the specification and practice of the invention as disclosed herein. It is intended that the specification, together with the example, be considered exemplary only, with the scope and spirit of the invention being indicated by the claims which follow.

EXAMPLES

Unless stated to the contrary, all percentages expressed herein refer to weight percentage.

The following abbreviations are further used:
CMHPG is carboxymethyl hydroxypropyl guar;
A-100, C-200, G-400, G-404, G-500, G-504 and G-544 refer to superabsorbent polymers, sold commercially under the Water Lock® product from Grain Processing Corp., Muscatine, Iowa;
"Brine" refers to a conventional sodium formate-brine which consists of water, propylene glycol (25 volume %), and sodium formate-salt.

Example 1

"Fluid 1" refers to a non-crosslinked insulating fluid as taught in U.S. Pat. No. 6,489,270, with 4 pound per barrel CMHPG, respectively, to 9.0 ppg sodium formate-brine having 25% by volume propylene glycol, a biocide, and a corrosion inhibitor.

"Fluid 2" refers to a thermal insulating fluid comprising about 1% by weight of CMHPG, 0.53% water-superabsorbent polymer G-504 (e.g., Water Lock product from Grain Processing Corp., Muscatine, Iowa), 25% by volume of propylene glycol, 75% by volume of sodium formate-brine.

"Fluid 3" refers to a thermal insulating fluid containing about 1% by weight of CMHPG, 25% by volume of propylene glycol, 75% by volume of sodium formate-brine, and 0.53% of biodegradable water-superabsorbent material made from guar gum and carrageenan, commercially available from Unitika, Ltd.

Fluids 2 and 3 were prepared by adding the CMHPG and water-superabsorbent material to propylene glycol under stir. After mixing for 5 minutes, this mixture was added to sodium formate-brine under rapid agitation.

After hydrating the mixture by a mechanical stirrer for 30 minutes, the pH was adjusted to about 9.5 with sodium hydroxide.

Viscosity measurements were made by placing a 350 milliliter sample of the fluid into a Grace 3500 viscometer cup. The cup was then placed on a Grace 3500 viscometer. The sample was sheared at 600, 300, 200, 100, 10, 1, 0.1, and 0.05 RPM at room temperature. The stresses associated to each rate were used to calculate the power law indices n and K; n refers to flow behavior index and K refers to consistency index set forth in the American Petroleum Institute's Bulletin RP-39. The fluid viscosity was then calculated by using the n and K values, and listed in Table I.

The desired rheological profile includes a low viscosity at high shear rate (high RPM) to facilitate the placement of the fluid inside an annulus and high viscosity at low shear rate (low RPM) to reduce the fluid convection caused by the temperature differential. Comparing the fluid of the invention (Fluid 3) to Fluid 1 and Fluid 2 in Table I, even though the high shear viscosity of Fluid 3 is 10-20% higher, it has significantly higher viscosity at lower shear rates (3 to 5 times higher).

TABLE I

| | Viscosity (cp) at Various Shear Rates | | | | | | | |
|---|---|---|---|---|---|---|---|---|
| | Shear Rate (RPM) | | | | | | | |
| | 0.05 | 0.1 | 1 | 10 | 100 | 200 | 300 | 600 |
| Fluid 1 | 23,008 | 20,168 | 9,795 | 2,399 | 439 | 262 | 194 | 98.1 |
| Fluid 2 | 43,960 | 38,526 | 12,419 | 2,358 | 420 | 252 | 195 | 116 |
| Fluid 3 | 121,012 | 86,353 | 66,087 | 19,013 | 3,457 | 539 | 215 | 129 |

Examples 2 and 3

Examples 2 and 3 illustrate the process of preparing oil-based gelling agents. In each of the examples, 1.25 ml of an organometallic complex crosslinker, commercially available as RGh-31, a product of BJ Services Company, was mixed with 1.25 ml of water. A guar gum/carrageenan superabsorbent material, commercially available from Unitika, Ltd., was added to the aqueous mixture to absorb the liquid solution and form a paste-like mixture. The resultant was then added to 250 ml base oil comprising isomerized $C_{16}$-$C_{18}$ alpha olefin. This is equivalent to 5 gal/1000 gal (gpt) of RG-31 loading.

Alternatively, the superabsorbent material was admixed with 1.25 ml of water to absorb the water and to form a paste. About 1.25 ml of the organometallic complex crosslinker, commercially available as XLO-5, a product of BJ Services Company, was then added to the paste and the crosslinker was allowed to be absorbed and form a paste-like mixture. The effect of the superabsorbent on delayed time is set forth in Table II.

TABLE II

| Base Oil (ml) | Gelling Agent (ml) | Crosslinker (ml) | Super Absorbent (g) | Vortex Closure (minute) | Crown Time (minute) |
|---|---|---|---|---|---|
| 250 | 1.25 | 1.25 | 0 | instant | instant |
| 250 | 1.25 | 1.25 | 0.125 | 49 | 53 |

As set forth in Table I, the addition of the superabsorbent causes a delay in crosslinking time.

The vortex closure and crown time were determined by pouring about 250 ml of the hydrocarbon into a blender jar and mixing the fluid at 115 rpm for approximately one minute. Approximately 5 gal/1,000 gal (1.25 ml) of gelling agent, commercially available as GO-64, a product of BJ Services Company, was then added. The resulting admixture was allowed to mix for 30 seconds. Approximately, 5 gpt of organometallic complex crosslinker, XLO-5, that had been pre-absorbed into the superabsorbent was then added. The vortex closure was measured as the time when the base gel covered the nut on the blade of the blender jar. After the vortex was closed, the gel continued to form until fluid formed a "dome surface." This was recorded as the crown time.

As set forth in Table I, use of the superabsorbent increased both the vortex closure and crown time. This is indicative that the presence of the superabsorbent causes a delay in crosslinking time.

Example 4

The procedure of Example 3 was repeated, except that the gelling agent used was that commercially available from BJ Services Company as RG-30 and the crosslinker, also available from BJ Services Company, was RG-31. Table III indicates the effective loading level of the superabsorbent on the delayed time.

TABLE III

| Base Oil (ml) | Gelling Agent (ml) | Crosslinker (ml) | Super Absorbent (g) | Vortex Closure (minute) | Crown Time (minute) |
|---|---|---|---|---|---|
| 250 | 1.25 | 1.25 | 0.0625 | 31 | 43 |
| 250 | 1.25 | 1.25 | 0.1250 | 118 | 140 |
| 250 | 1.25 | 1.25 | 0.1875 | 160 | 176 |

As set forth in Table III, the loading level of the superabsorbent affected the crosslinking time.

From the foregoing, it will be observed that numerous variations and modifications may be effected without departing from the true spirit and scope of the novel concepts of the invention.

What is claimed is:

1. A method for enhancing the productivity of a formation comprising introducing into the formation an oil-based composition comprising a polysaccharide-based water-superabsorbent material, a crosslinking agent absorbed onto the superabsorbent material and a gelling agent.

2. The method of claim 1, wherein the composition further comprises a proppant.

3. The method of claim 1, wherein the composition is an acid stimulation fluid.

4. The method of claim 1, wherein the superabsorbent material is made from guar gum and carrageenan.

5. The method of claim 1, wherein the gelling agent is an alkyl phosphate ester.

6. The method of claim 5, wherein the alkyl phosphate ester is a alkyl diester acid.

7. The method of claim 5, wherein the alkyl phosphate ester is prepared by reacting a $C_{3-18}$ aliphatic alcohol with phosphorous pentoxide.

8. The method of claim 1, wherein the water-superabsorbent material is capable of absorbing a minimum of its own weight in water.

9. The method of claim 1, wherein the viscosity of the composition is such so as to render the composition pumpable.

10. The method of claim 1, wherein the water-superabsorbent material is present in an amount ranging from about 0.05% to about 30% by weight, relative to the total weight of the composition.

11. The method of claim 1, wherein the crosslinking agent is an aluminum or ferric crosslinking agent.

12. The method of claim 11, wherein the crosslinking agent contains Fe (II) or Fe (III) or a complex which is capable of releasing Fe (II) or Fe (III).

13. A method of fracturing a subterranean formation comprising introducing into the formation for a time and at a pressure sufficient to fracture the formation a pumpable oil-based composition comprising a polysaccharide-based water-superabsorbent material, a crosslinking agent absorbed onto the superabsorbent material and a gelling agent.

14. The method of claim 13, wherein the viscosity of the oil-based composition is sufficient to suspend and carry proppant into the formation.

15. The method of claim 13, wherein the superabsorbent material is made from guar gum and carrageenan.

16. The method of claim 13, wherein the gelling agent is an alkyl phosphate ester.

17. The method of claim 16, wherein the alkyl phosphate ester is a $C_{3-18}$ alkyl diester acid.

18. The method of claim 13, wherein the superabsorbent material is capable of absorbing a minimum of its own weight in water.

19. The method of claim 13, wherein the at least one water-superabsorbent material is present in an amount ranging from about 0.05% to about 30% by weight, relative to the total weight of the composition.

20. The method of claim 13, wherein the crosslinking agent is an aluminum or ferric crosslinking agent.

21. The method of claim 20, wherein the crosslinking agent contains Fe (II) or Fe (III) or a complex which is capable of releasing Fe (II) or Fe (III).

* * * * *

UNITED STATES PATENT AND TRADEMARK OFFICE
CERTIFICATE OF CORRECTION

PATENT NO.         : 7,395,863 B2
APPLICATION NO.    : 11/953645
DATED              : July 8, 2008
INVENTOR(S)        : Wang et al.

Page 1 of 1

It is certified that error appears in the above-identified patent and that said Letters Patent is hereby corrected as shown below:

Column 14, Line 20, insert --$C_{3-18}$-- before the word "alkyl"

Signed and Sealed this

Ninth Day of September, 2008

JON W. DUDAS
*Director of the United States Patent and Trademark Office*